US009386194B2

(12) United States Patent
Basulto (10) Patent No.: US 9,386,194 B2
(45) Date of Patent: Jul. 5, 2016

(54) RECEPTACLE FOR AN IMAGE CAPTURE COMPUTING DEVICE

(71) Applicant: iOgrapher, LLC, San Gabriel, CA (US)

(72) Inventor: David Basulto, San Gabriel, CA (US)

(73) Assignee: iOgrapher, LLC, San Gabriel, CA (US)

( * ) Notice: Subject to any disclaimer, the term of this patent is extended or adjusted under 35 U.S.C. 154(b) by 22 days.

(21) Appl. No.: 13/895,349

(22) Filed: May 15, 2013

(65) Prior Publication Data

US 2014/0240527 A1      Aug. 28, 2014

Related U.S. Application Data

(60) Provisional application No. 61/768,751, filed on Feb. 25, 2013.

(51) Int. Cl.
*H04N 5/225* (2006.01)

(52) U.S. Cl.
CPC .................. *H04N 5/2252* (2013.01)

(58) Field of Classification Search
CPC ................................ A45C 2013/025
USPC ................................. 348/373–375
See application file for complete search history.

(56) References Cited

U.S. PATENT DOCUMENTS

| 8,007,188 B2 * | 8/2011 | Orf ................................ 396/419 |
| 2011/0069947 A1 * | 3/2011 | Orf ................................ 396/419 |
| 2012/0075801 A1 * | 3/2012 | Yang et al. ............... 361/679.59 |
| 2012/0228181 A1 * | 9/2012 | Damon .................. A45C 11/00 206/521 |
| 2012/0275025 A1 * | 11/2012 | Parrill .......................... 359/511 |
| 2012/0300394 A1 * | 11/2012 | Norfolk ................... 361/679.55 |
| 2013/0094846 A1 * | 4/2013 | Apter ........................... 396/419 |
| 2013/0113229 A1 * | 5/2013 | Wu .......................... A45F 5/10 294/138 |
| 2013/0120258 A1 * | 5/2013 | Maus ........................... 345/161 |
| 2013/0180879 A1 * | 7/2013 | O'Dowd et al. ............. 206/521 |

OTHER PUBLICATIONS

Makayama product website www.makayama.com, archived Jan. 12, 2012, https://web.archive.org/web/20120112095553/http://www.makayama.com/moviemount.html.

* cited by examiner

*Primary Examiner* — Sinh Tran
*Assistant Examiner* — Selam T Gebriel
(74) *Attorney, Agent, or Firm* — Patent Ingenuity, P.C.; Samuel K. Simpson (57) ABSTRACT

An apparatus comprises a receptacle configured to receive a mobile computing device that has an integrated image capture component. Further, the apparatus comprises a plurality of handles such that each handle is operably connected to the receptacle. Another apparatus comprises a receptacle configured to receive a mobile computing device that has an integrated image capture component. Further, the apparatus comprises a handle such that the handle is operably connected to the receptacle.

20 Claims, 8 Drawing Sheets

RECEPTACLE FOR AN IMAGE CAPTURE COMPUTING DEVICE

RELATED APPLICATIONS

This application claims priority to U.S. Provisional Patent Application Ser. No. 61/768,751, filed on Feb. 25, 2013, entitled A PLASTIC CASE FOR THE IPAD MINI AND IPAD. IT HAS HANDLES ON THE SIDES, 3 ACCESSORY SHOE AREAS, A TRIPOD MOUNT, AND THE ABILITY TO SCREW ON 37 MM LENSES., which is hereby incorporated by reference in its entirety.

BACKGROUND

1. Field

This disclosure generally relates to the field of image capture. More particularly, the disclosure relates to a receptacle for an image capture computing device.

2. General Background

Current mobile computing devices, e.g., tablet devices, smartphones, and/or the like, provide image capture capabilities, e.g., still or motion, that are comparable with standard image capture devices such as standard cameras. Yet the picture quality from such mobile computing devices is often of a lesser quality than that of standard cameras. Standard cameras provide users with firm stabilization abilities. For example, a user can firmly hold a standard camera with both hands or place a standard camera on a tripod to minimize possible movement during image capture.

In contrast, current mobile computing devices do not provide similar stabilization to that of a standard camera. Users often have difficulty keeping the mobile computing device stable during image capture. The mobile computing device often wobbles during the image capture, which then results in pictures or videos that are often of a less than ideal quality.

Further, the standard cameras often allow photographers to interchange lenses and add additional components to vary viewing and lighting conditions. Current mobile computing devices simply do not provide such features. Users are often limited to the image capture capabilities that are integrated within the mobile computing device. As a result, current mobile computing devices provide limited capabilities to photographers.

SUMMARY

In one aspect of the disclosure, an apparatus is provided. The apparatus comprises a receptacle configured to receive a mobile computing device that has an integrated image capture component. Further, the apparatus comprises a plurality of handles such that each handle is operably connected to the receptacle.

In another aspect of the disclosure, an apparatus is provided. The apparatus comprises a receptacle configured to receive a mobile computing device that has an integrated image capture component. Further, the apparatus comprises a handle such that the handle is operably connected to the receptacle.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A receptacle for an image capture computing device is provided. The image capture computing device is received by the receptacle. A user then grasps the receptacle and motions the receptacle to a position for image capture. The receptacle has handles that provide for stabilization of the receptacle and the image capture computing device. As a result, users performing image capture have the ability to capture still images and/or video images with stabilization. In contrast with heavy receptacles that do not have handles, the receptacle for the image capture computing device provides a lightweight configuration that provides stabilization for an image capture computing device.

Further, the receptacle may have additional components that allow the user performing image capture to vary image capture conditions. For example, the receptacle may receive a variety of lenses that may be utilized to vary viewing conditions. Further, various lighting and/or audio equipment may be positioned on the receptacle to vary lighting and/or audio conditions. The receptacle may also have a tripod component so that the receptacle may be stabilized with a tripod to minimize motion of the image capture computing device during image capture.

Figure 1:
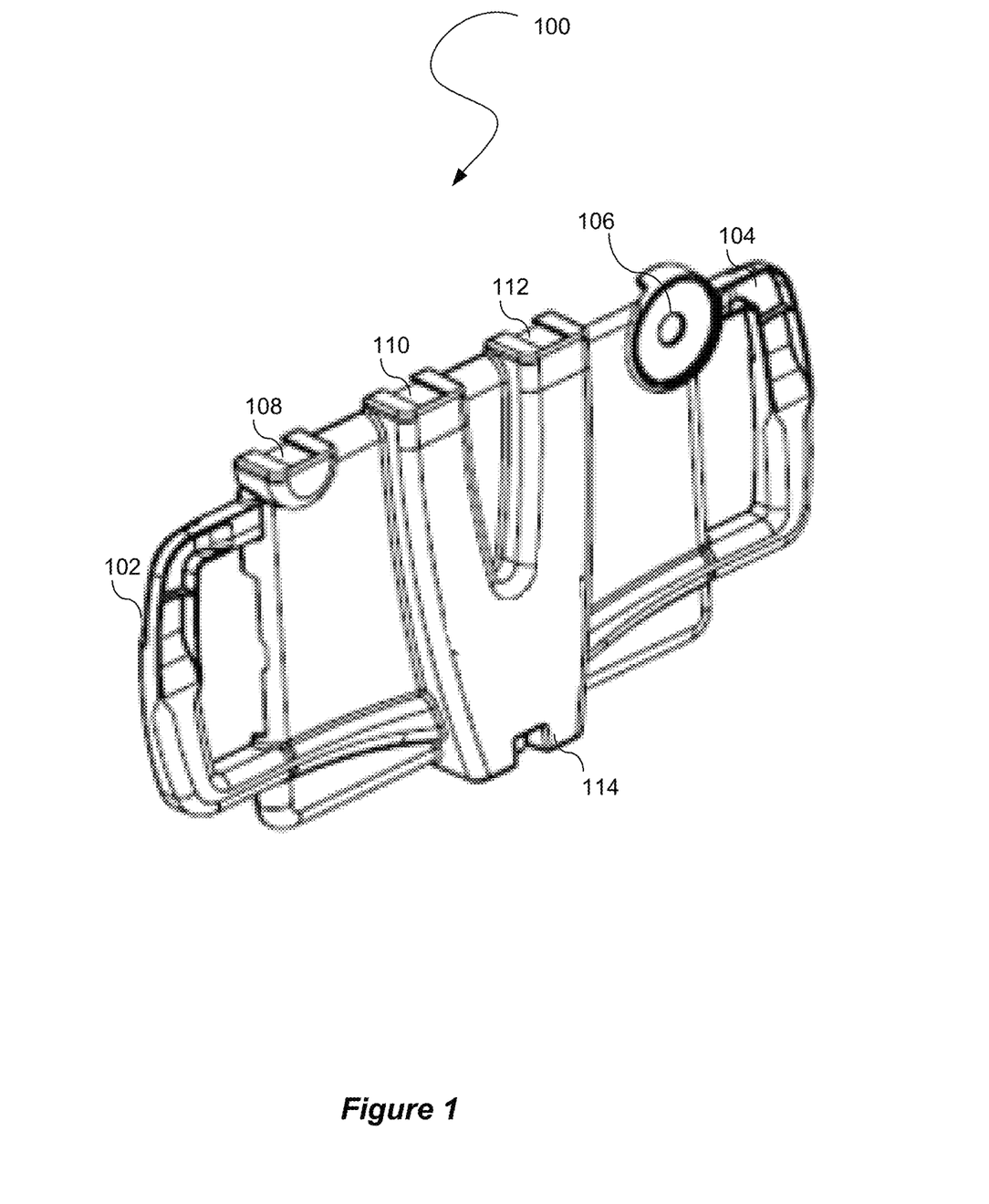
FIG. 1 illustrates a front view of an image capture computing device receptacle.

FIG. 1 illustrates a front view of an image capture computing device receptacle 100. In one embodiment, the image capture computing device 100 includes a plurality of handles, e.g., a right handle 102 and a left handle 104. The front of the image capture computing device receptacle 100 is illustrated from the perspective of what another user views if in front of the image capture computing device 100 when an image is captured by a user such as a photographer. The right handle 102 and the left handle 104 allow the user to perform image capture with minimal wobbling. As a result, the photographer is able to perform image capture with more stabilization and accuracy than without the image capture computing device receptacle 100. Although the right handle 102 and the left handle 104 are illustrated, the handles may be in other locations, e.g., a top handle and a bottom handle. Further, a single handle or more than two handles may be utilized. The right handle 102 and the left handle 104 are provided merely for illustrative purposes.

The image capture computing device receptacle 100 also has an aperture 106. The aperture 106 is configured so that an image capture component, e.g., a lens of a mobile image capture computing device, may be positioned to capture images through the aperture 106. In one embodiment, the aperture 106 is configured to be in substantial proximity to the image capture component. For example, the aperture may be narrow enough to only be positioned over the lens to minimize reflection.

In another embodiment, the image capture computing device receptacle 100 has a plurality of accessory receiving means. As an example, the image capture computing device receptacle 100 has a receiving means 108, a receiving means 110, a receiving means 112, and a receiving means 114. The various receiving means may be utilized to receive accessories such as lighting devices, e.g., lamps, audio devices, e.g., microphones, additional lenses, e.g., wide angle lenses, tripods, and/or the like. For example, the receiving means 114 may receive a tripod mount to provide further stabilization for the image capture computing device receptacle 100 with a tripod. A single or different quantity of receiving means may be utilized from that illustrated in FIG. 1.

In one embodiment, the right handle 102 and the left handle 104 are integrated within the same frame as the image capture computing device receptacle 100. In other words, a single molding may be utilized for the frame and the handles. In an alternative embodiment, the right handle 102 and the left handle are detachable from the frame.

Figure 2:
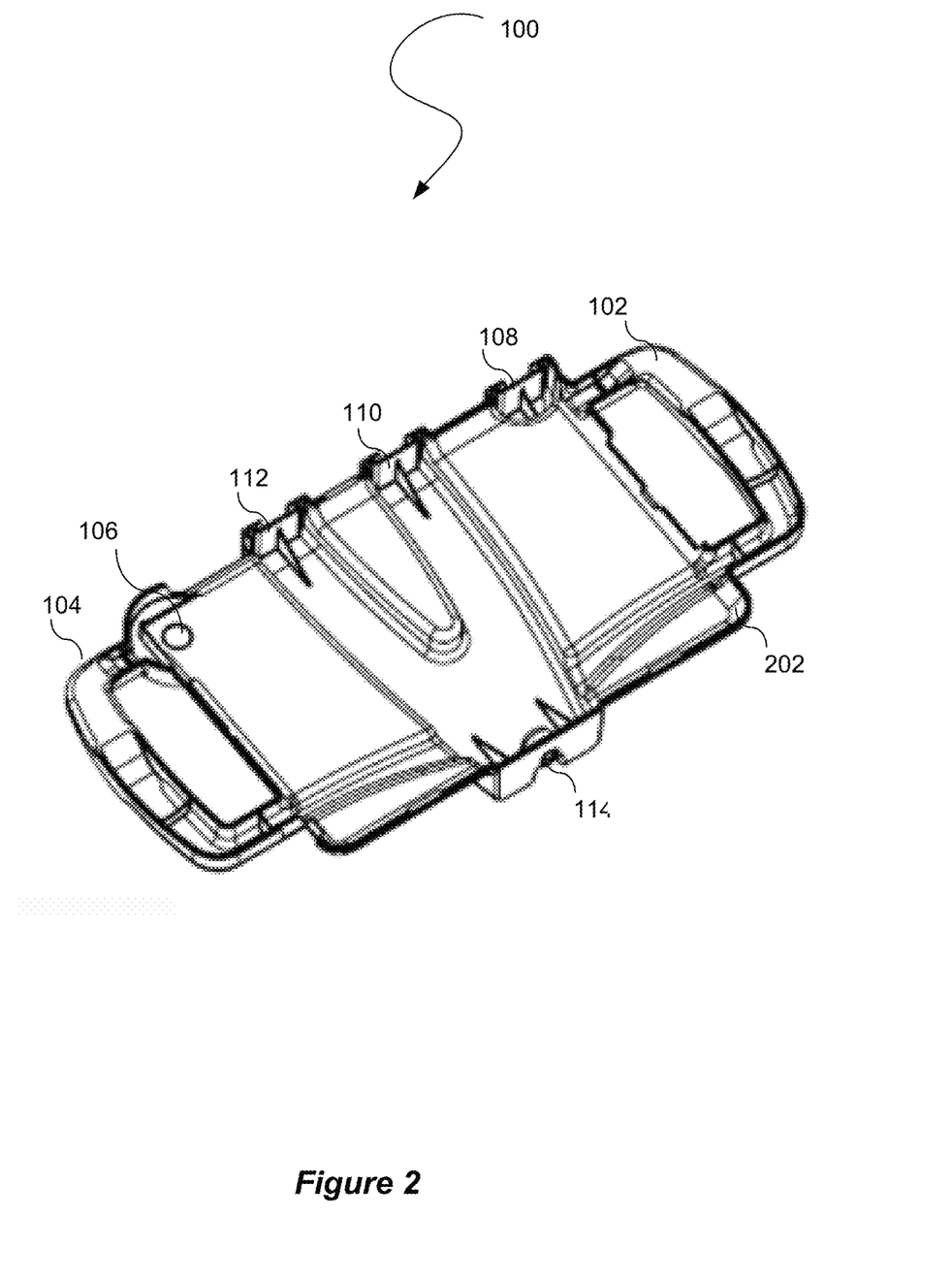
FIG. 2 illustrates a back view of the image capture computing device receptacle.

FIG. 2 illustrates a back view of the image capture computing device receptacle 100. The back view is from the perspective of the photographer that is placing the mobile computing device in the image capture computing device receptacle 100. In one embodiment, the image capture computing device receptacle 100 has a receiving means for receiving the image capture computing device receptacle 100. An example of the receiving means is the lip 202. The lip 202 may be positioned throughout all of the frame or at least a portion of the frame. A photographer may then snap the mobile computing device within the lip to secure the mobile computing device in the image capture computing device receptacle 100. As a result, the photographer may easily snap the mobile computing device into position. The lip is only an example of the receiving means. The receiving means may also be a fastening means such as a screw, bolt, nail, clip, and/or the like.

Figure 3:
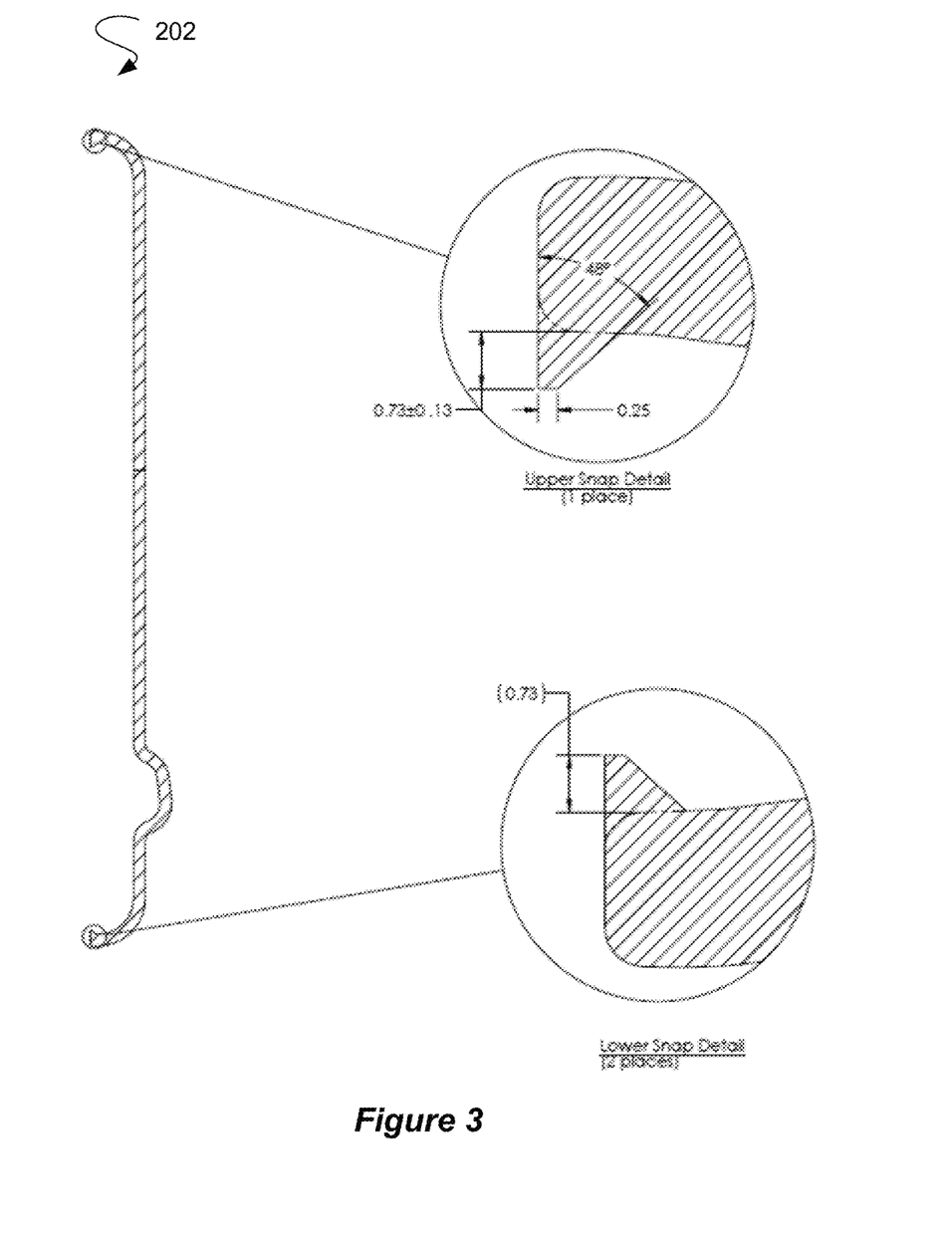
FIG. 3 illustrates a side view of the receiving means.

FIG. 3 illustrates a side view of the receiving means 202. The receiving means 202 is illustrated as a lip only for illustrative purposes as various other receiving means may be utilized.

Figure 4:
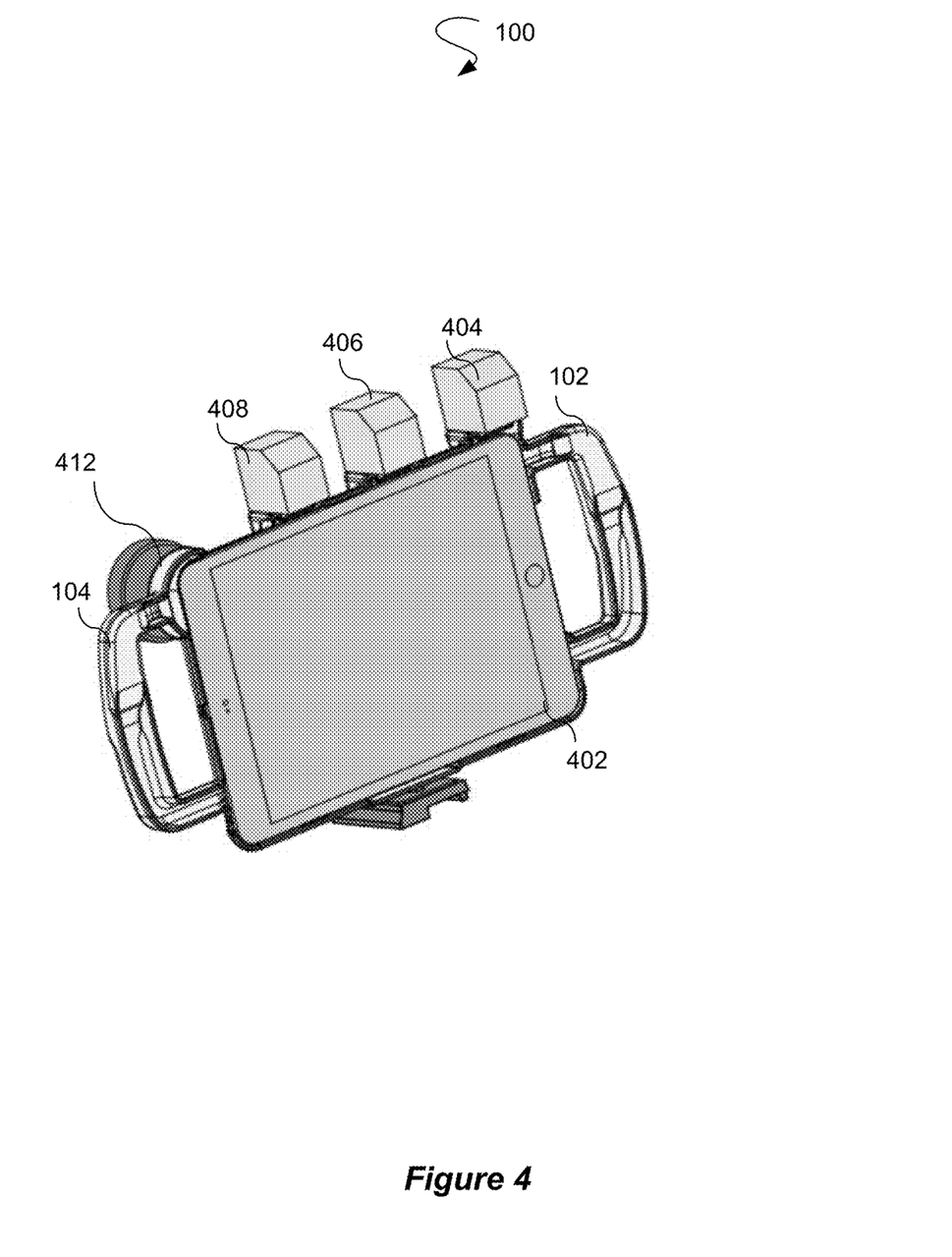
FIG. 4 illustrates a front view of the image capture computing device receptacle with a mobile computing device secured to the image capture computing device receptacle.

FIG. 4 illustrates a front view of the image capture computing device receptacle 100 with a mobile computing device 402 secured to the image capture computing device receptacle 100. The mobile computing device 402 may be a tablet device, smartphone, or any other mobile device. Further, the mobile computing device 402 may have an image capture component, e.g., a built in camera, for still or motion image capture. Various accessories 404, 406, and 408 may be connected to the receiving means 108, 110, and 112. The receiving means 108, 110, and 112 may be a lip, screw, bolt, nail, clip, and/or the like. Further, a lens accessory 412 is positioned over the aperture 106.

Although a frame single frame is illustrated in FIG. 4, multiple frames may alternatively be utilized to secure the mobile computing device 402. In other words, the image capture computing device receptacle 100 may comprise multiple parts such as a front portion and a back portion to secure the mobile computing device 402 to the image capture computing device receptacle 100. Accordingly, the image capture computing device receptacle 100 is not limited to a single frame as multiple frames may alternatively be utilized.

Figure 5:
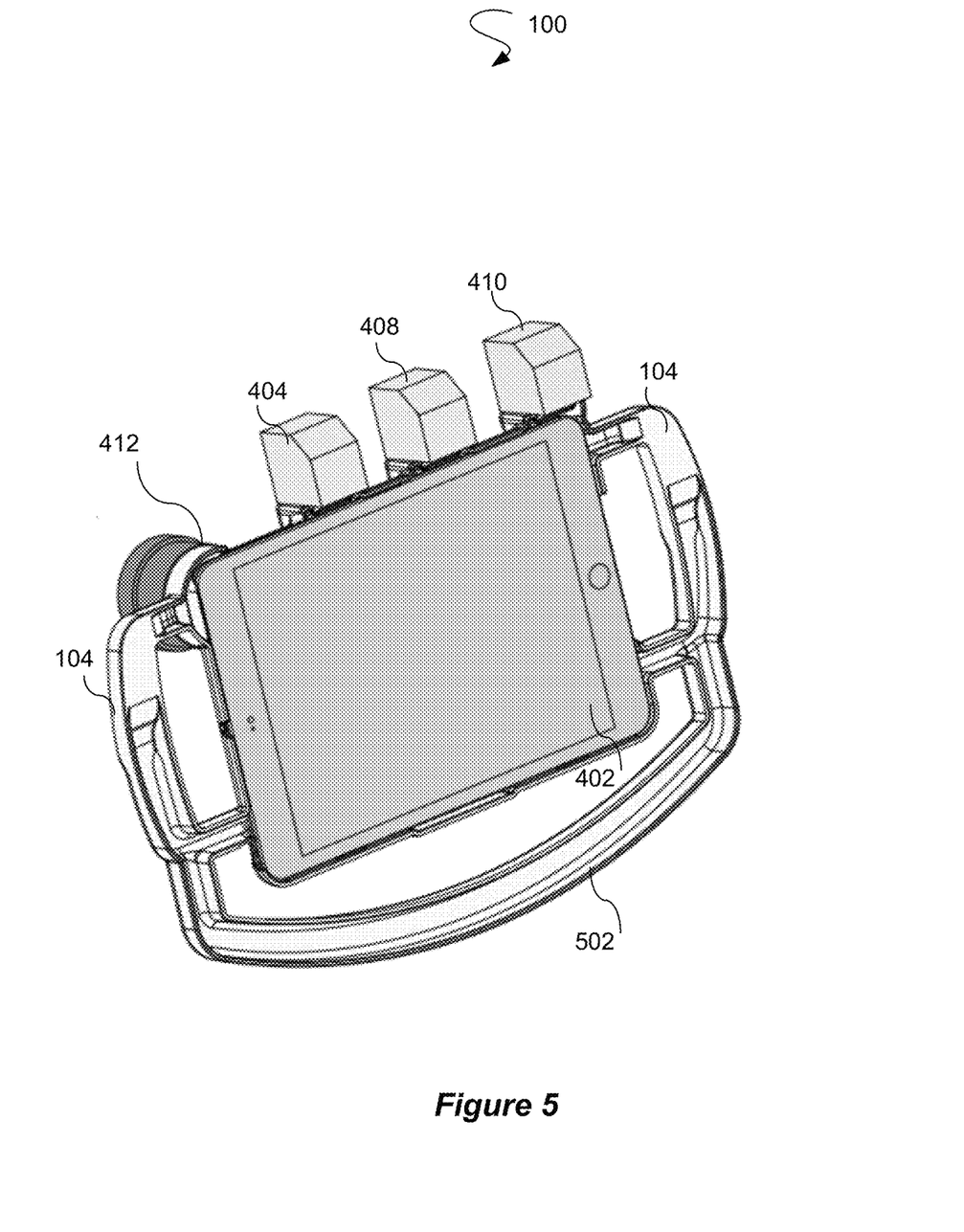
FIG. 5 illustrates a front view of the image capture computing device receptacle 100 with the mobile computing device secured to the image capture computing device receptacle and the image capture computing device receptacle having a bottom handle.

Although FIGS. 1-4 illustrated two handles, a single handle or more than two handles may be utilized. FIG. 5 illustrates a front view of the image capture computing device receptacle 100 with the mobile computing device 402 secured to the image capture computing device receptacle 100 and the image capture computing device receptacle 100 having a bottom handle 502. Alternatively, the right handle 102, the left handle 104, and the bottom handle 502 may be considered a single handle. Further, FIG. 6 illustrates a front view of the image capture computing device receptacle 100 with the mobile computing device 402 secured to the image capture computing device receptacle 100 and the image capture computing device receptacle 100 only having the left handle 104 for a handle.

Figure 6:
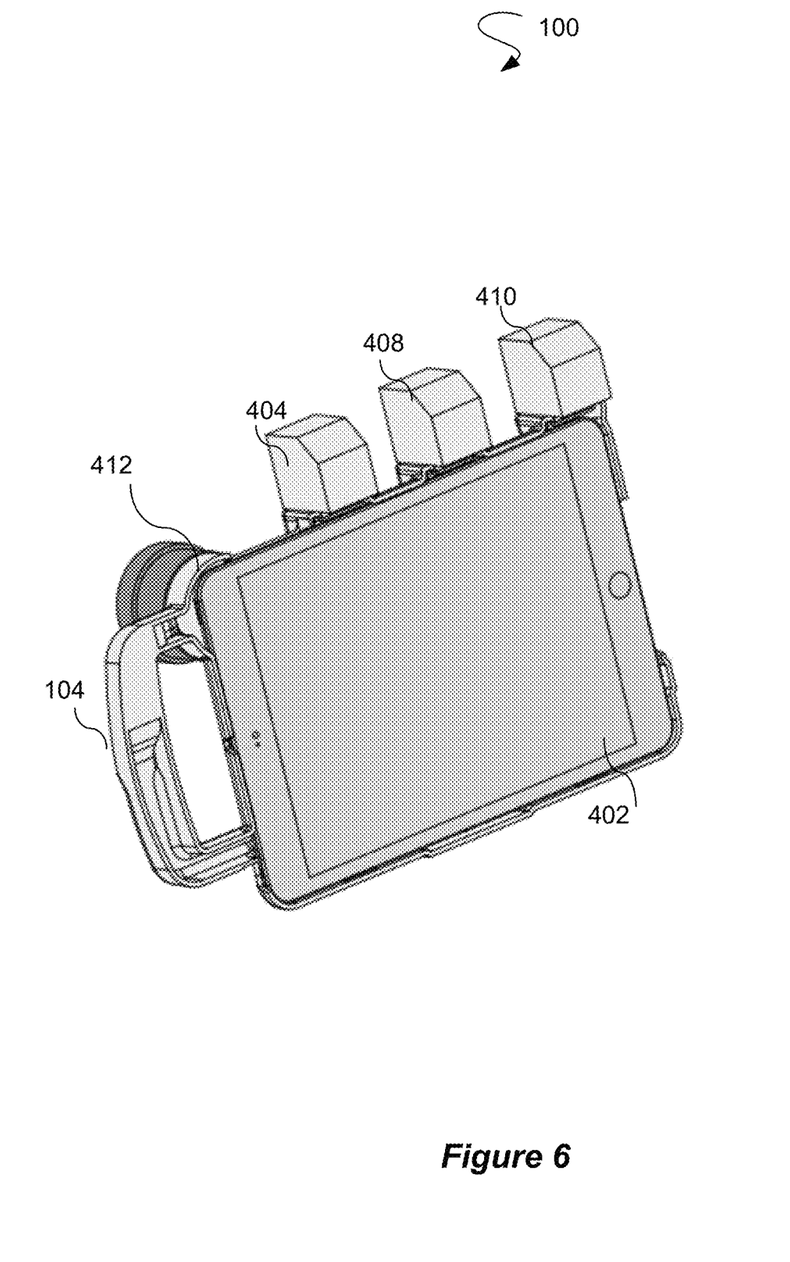
FIG. 6 illustrates a front view of the image capture computing device receptacle with the mobile computing device secured to the image capture computing device receptacle and the image capture computing device receptacle only having the right handle for a handle.
Figure 7:
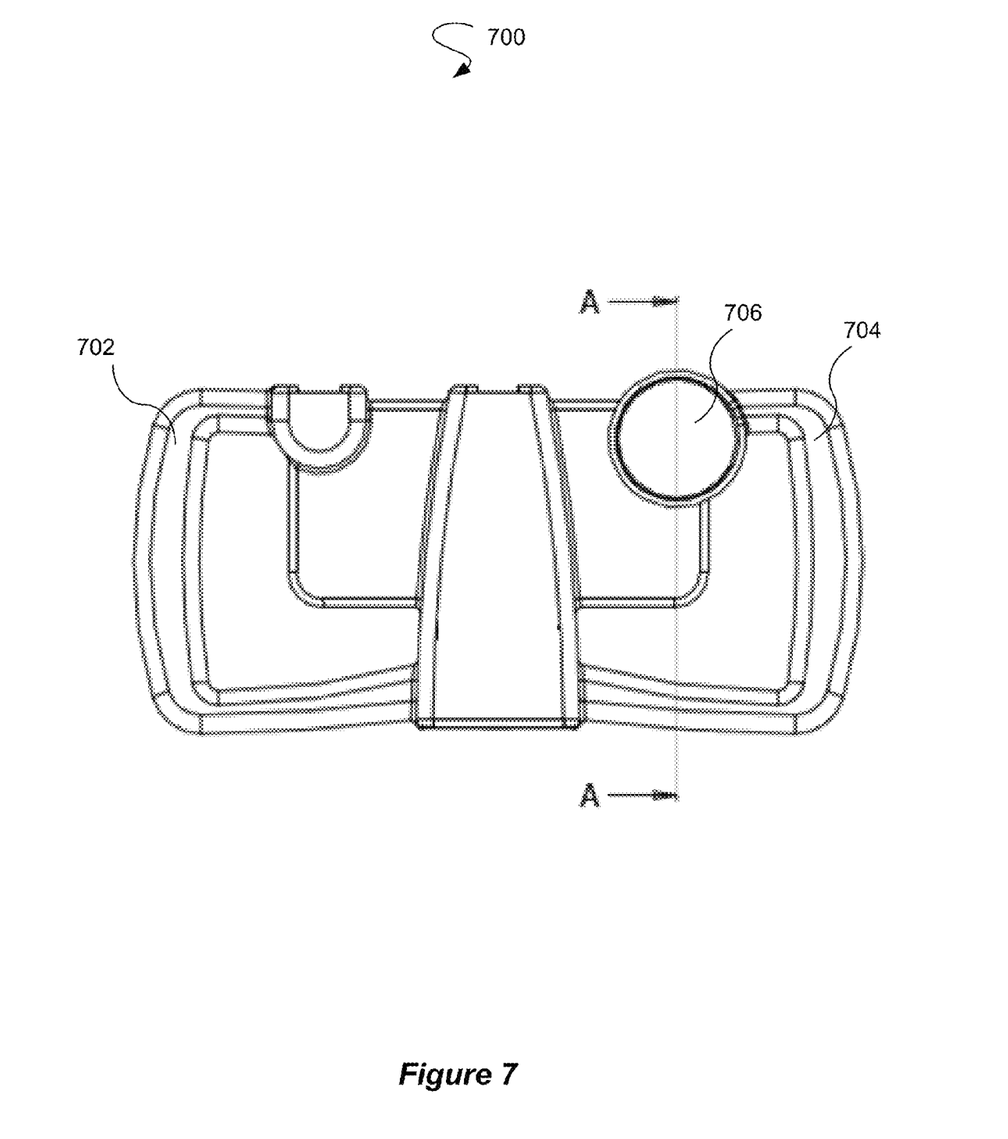
FIG. 7 illustrates a front view of an image capture computing device receptacle that is configured to receive a smartphone.
Figure 8:
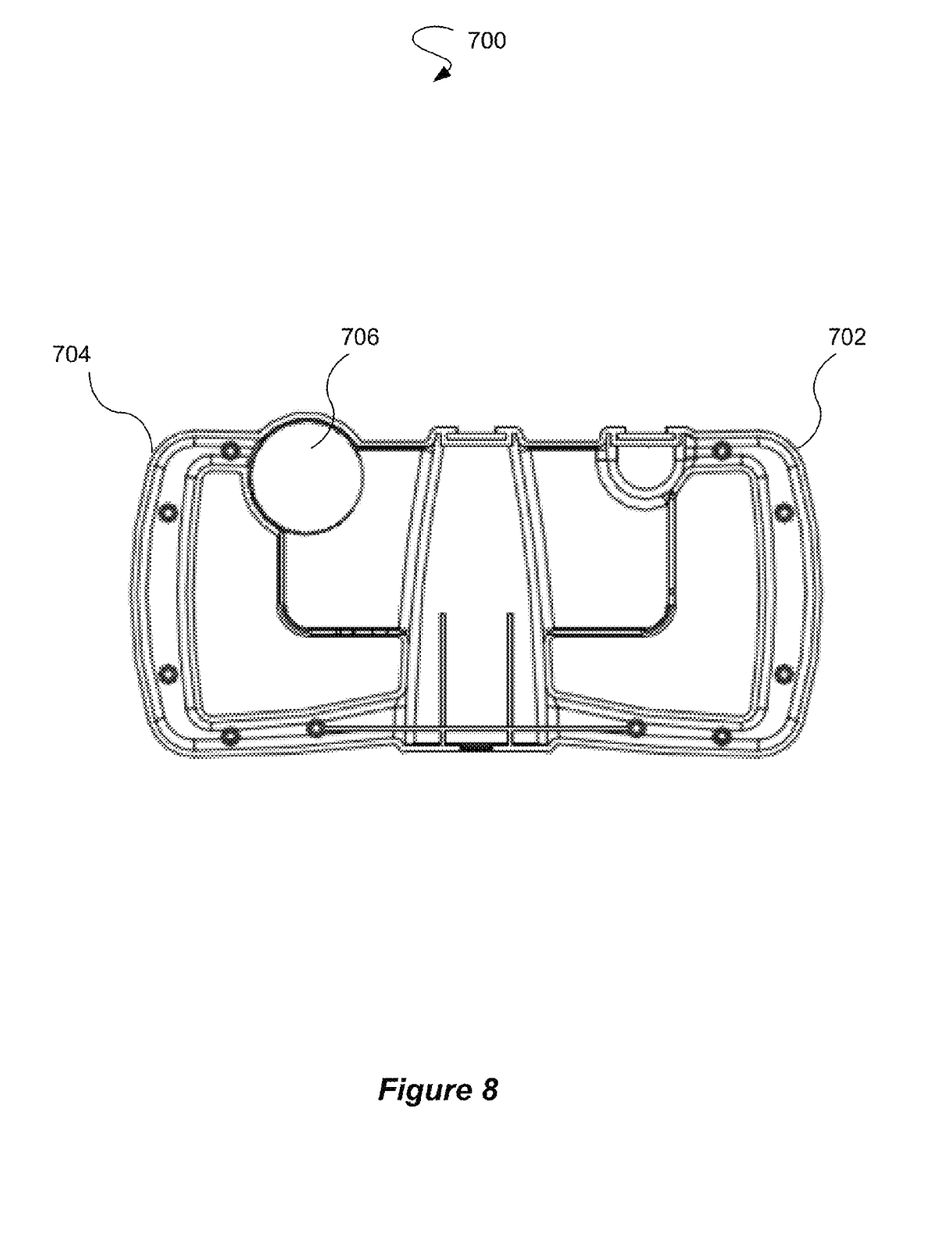
FIG. 8 illustrates a back view of the image capture computing device receptacle illustrated in FIG. 7.

Although FIGS. 4-6 illustrate the mobile computing device 402 as a tablet device, a smartphone may alternatively be utilized. Accordingly, FIG. 7 illustrates a front view of an image capture computing device receptacle 700 that is configured to receive a smartphone. The image capture computing device receptacle 700 has a right handle 702 and a left handle 704. The image capture computing device receptacle 700 also has an aperture 706. FIG. 8 illustrates a back view of the image capture computing device receptacle 700 illustrated in FIG. 7.

A variety of types of materials may be utilized for the image capture computing device receptacles. For example, plastic, carbonite, metal, or the like may be utilized.

It is understood that the apparatuses described herein may also be applied in other types of apparatuses. Those skilled in the art will appreciate that the various adaptations and modifications of the embodiments of the apparatuses described herein may be configured without departing from the scope and spirit of the apparatuses. Therefore, it is to be understood that, within the scope of the appended claims, the present apparatuses may be practiced other than as specifically described herein.

I claim:

1. An apparatus comprising:
a receptacle configured to receive a mobile computing device that has an integrated image capture component such that an external perimeter of the mobile computing device is in contact with an internal perimeter of the receptacle without an intervening component, the receptacle comprising an aperture configured such that the integrated image capture component is positioned to capture images through the aperture, the receptacle further comprising a geometrical shape portion that surrounds the aperture; and
a plurality of handles such that (i) a top portion and a bottom portion of each handle are each externally connected to a portion of an external perimeter of the receptacle that conforms to a shape of the mobile computing device without an intervening component between the external perimeter of the receptacle and the plurality of handles, (ii) a central portion of each handle externally extends, in at least one of a plane that encompasses the external perimeter of the receptacle and one or more planes directed toward a user, a distance from the external perimeter of the receptacle without connection to the external perimeter of the receptacle and without protruding through the external perimeter of the receptacle, and (iii) at least one of the plurality of handles being directly connected to the geometrical shape portion.

2. The apparatus of claim 1, further comprising a frame that comprises the receptacle and the plurality of handles.

3. The apparatus of claim 1, wherein each of the plurality of handles is detachable from the receptacle.

4. The apparatus of claim 1, wherein the plurality of handles comprises a right handle and a left handle.

5. The apparatus of claim 1, wherein the plurality of handles comprises a right handle, a left handle, and a top handle.

6. The apparatus of claim 1, wherein the plurality of handles comprises a right handle, a left handle, and a bottom handle.

7. The apparatus of claim 1, wherein the plurality of handles comprises a right handle, a left handle, a top handle, and a bottom handle.

8. The apparatus of claim 1, further comprising a receiving means for receiving the mobile computing device.

9. The apparatus of claim 1, further comprising a receiving means for receiving an accessory device.

10. The apparatus of claim 9, wherein the accessory device is a lens accessory.

11. The apparatus of claim 9, wherein the accessory device is an audio accessory.

12. The apparatus of claim 9, wherein the accessory device is a tripod mount.

13. The apparatus of claim 1, wherein the receptacle has an aperture through which a lens of the image capture component is positioned.

14. The apparatus of claim 13, wherein the aperture is in substantial proximity to the image capture component to minimize reflection.

15. The apparatus of claim 1, wherein the mobile computing device is selected from the group consisting of a tablet device and a smartphone.

16. An apparatus comprising:
a receptacle configured to receive a mobile computing device that has an integrated image capture component such that an external perimeter of the mobile computing device is in contact with an internal perimeter of the receptacle without an intervening component, the receptacle comprising an aperture configured such that the integrated image capture component is positioned to capture images through the aperture, the receptacle further comprising a geometrical portion shape that surrounds the aperture; and
a handle such that (i) a top portion and a bottom portion of the handle is externally connected to a portion of an external perimeter of the receptacle that conforms to a shape of the mobile computing device without an intervening component between the external perimeter of the receptacle and the handle, (ii) a central portion of the handle externally extends, in at least one of a plane that encompasses the external perimeter of the receptacle and one or more planes directed toward a user, a distance from an external perimeter of the receptacle without connection to the external perimeter of the receptacle and without protruding through the external perimeter of the receptacle, and (iii) the handle is directly connected to the geometrical shape portion.

17. The apparatus of claim 16, further comprising a frame that comprises the receptacle and the handle.

18. The apparatus of claim 16, wherein the handle is detachable from the receptacle.

19. The apparatus of claim 16, further comprising a receiving means for receiving the mobile computing device.

20. The apparatus of claim 16, further comprising a receiving means for receiving an accessory device.

* * * * *